Patented May 17, 1949

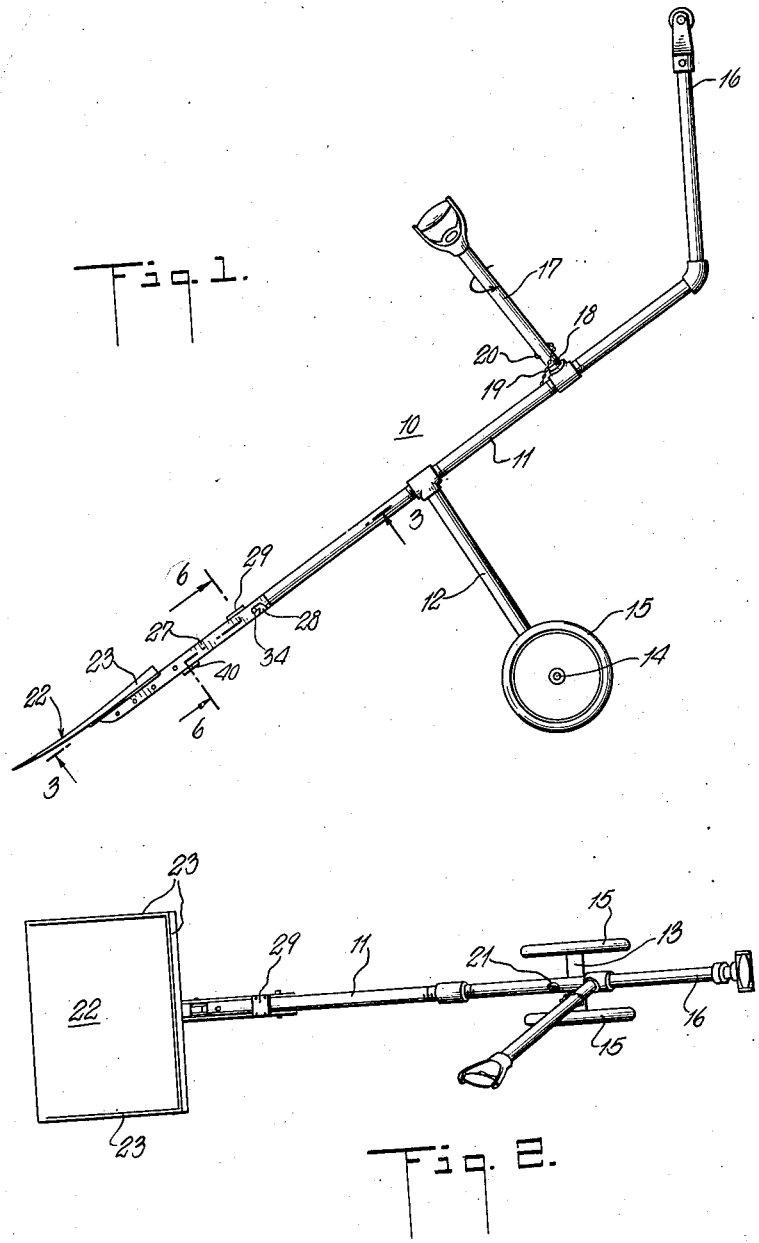

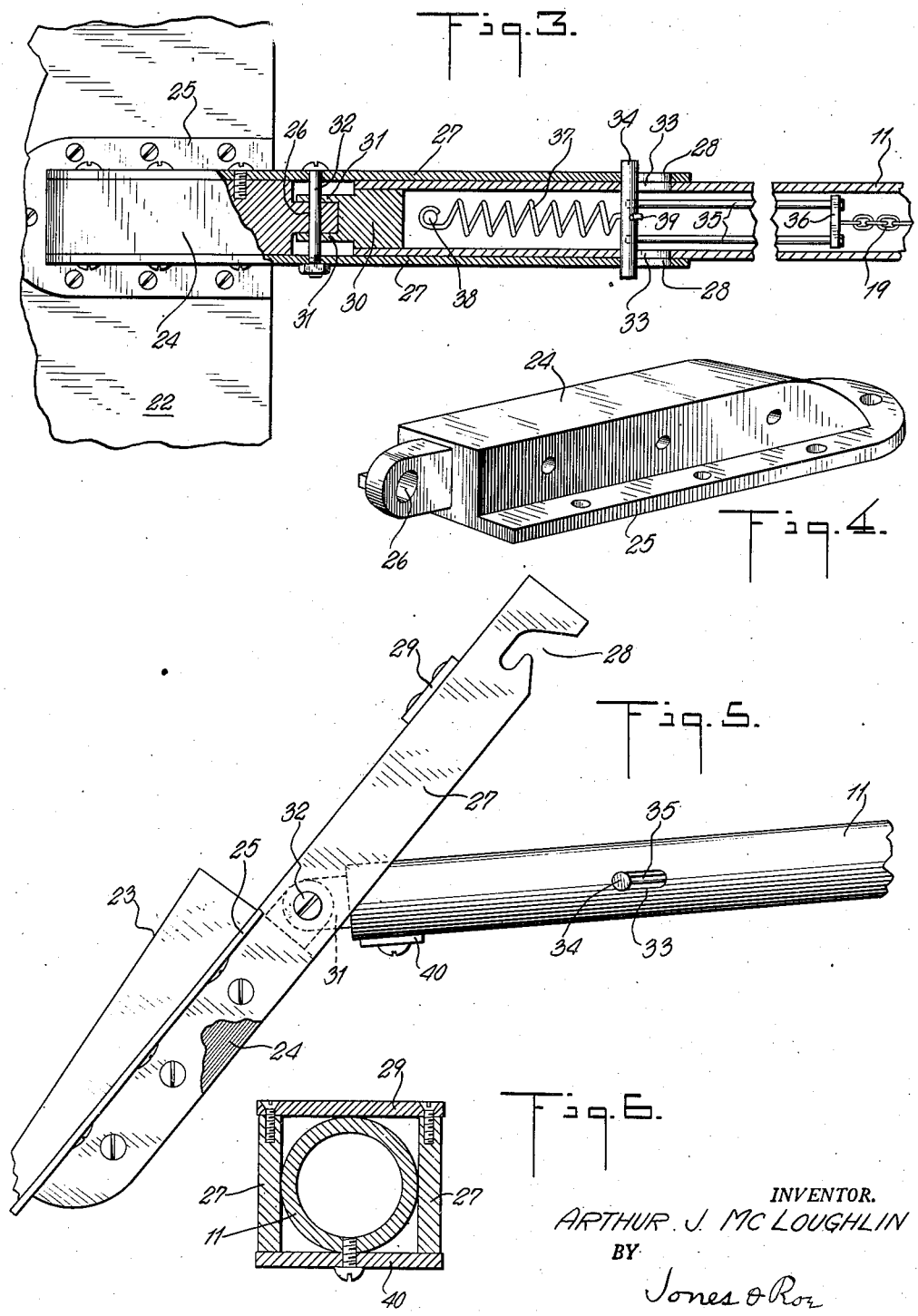

2,470,217

UNITED STATES PATENT OFFICE 2,470,217

SNOW SHOVEL

Arthur J. McLoughlin, Elmhurst, N. Y.

Application April 19, 1947, Serial No. 742,617

2 Claims. (Cl. 37—130)

My invention comprehends a portable shovel for handling various kinds of material. Primarily, it is of the wheeled type, although easily susceptible of being mounted on runners, if desired; and is preferably, though not necessarily, intended for use at home.

In one form, the implement includes a boom supported by running gear, and equipped with a pair of handle bars for steering and operating a hinged scoop. In practical use, one grasps the handle bars, then forces the scoop into the substance to be moved—snow, for example, gets a load, withdraws the implement, transports it to any suitable spot and deposits the load.

The handle bars are arranged to make for facile manipulation of the shovel, and one of them is connected to mechanism which controls the opening and closing of the hinged scoop for the purpose of loading and unloading the same. Present, also, are certain refinements in construction, as respects bracing, and eliminating undue lateral play of the components of the breech between the boom and the scoop.

In short, I have devised a shovel which is thoroughly practical in construction and operation, which may be manufactured economically, and which, in use, will avoid the strain, overexertion and back-wrenching incident to the employment of the common shovel.

In the accompanying drawings:

Fig. 1 is a side elevation of the shovel, and

Fig. 2 is a top plan view thereof.

Fig. 3 is a longitudinal section of the latch and breech mechanism between the boom and the scoop, taken substantially along line 3—3 of Fig. 1.

Fig. 4 is a perspective view of the scoop-bar and flange removed from scoop.

Fig. 5 is a side elevation of the lower extremity of the boom and the scoop, the latter being shown in dumped position, and Fig. 6 is a transverse section on lines 6—6 of Fig. 1.

Referring in detail to the drawings, and particularly Figs. 1 and 2, the invention comprises what I call a boom 10 consisting of an elongated tubular rod 11 having a leg 12 about midway thereof and a transversely disposed sleeve 13, enclosing an axle 14, at its lower end. Upon opposite terminals of the axle are mounted wheels 15—said leg and its appurtenances virtually constituting an under carriage or running gear. Projecting vertically from the rear end of rod 11 and at an obtuse angle thereto is a rigid handle-bar 16, and at a point intermediate the leg and handle-bar 16 a second handle-bar 17 is rotatably mounted—as by complemental screw threads 18—to rod 11. As best seen in Fig. 1, handle-bar 17 is disposed in parallelism with leg 12 upon the opposite side of rod 11 and extends at an acute angle laterally of the axis of the rod to facilitate manipulation by the left hand.

A chain 19 is anchored at 20 to the lower extremity of handle-bar 17 and is trained through opening 21 of tubular rod 11 for connection with scoop assembly, as will be explained.

Referring now to Figs. 3 to 6 inclusive, the scoop per se is indicated at 22, and is constructed of any suitable size and contour, with flanged side and rear edges 23. Centrally at the upper part of the scoop and adjacent its underneath side, is a flange member 24 (Fig. 4) provided with a base attaching-flange 25 and a longitudinally rearwardly projecting bar with eye 26. Also disposed rearwardly and fixed to opposite sides of the flange member are twin plates 27, (Fig. 5) which are secured to the flange member in equidistantly spaced relationship and at their outer terminals are equipped with wide-mouthed hook-shaped slots 28 and a tie-plate 29.

Reverting now to the tubular rod 11, its lower end is closed with a plug 30 which is bifurcated at 31 so as to embrace opposite sides of eye 26, and together with the transverse pintle 32, form a hinge between the rod and the scoop. Further, the lower extremity of the rod is constituted with diametric companion slots 33. In these slots, as well as slots 28 of plates 27, a cross-latch is designed to function. This latch is carried by a pair of links 35 joined to head 36, and connected to the lower end of chain 19—the link and head assembly being designed to avoid undue lateral play of the latch. To provide for flexibility one end of a coil spring 37 is fastened to a pin 38, which is fixed transversely in tubular rod 11 while the other end 39 is secured to the latch.

Cooperating with tie-plate 29 on the top of plates 27 is plate 40 carried by the lower terminal of rod 11 and extending beyond the circumference of the rod so as to abut the lower edges of plates 27 (Fig. 6). In this manner plates 27 are maintained in true alinement by tie-plate 29, and plate 40 serves as a stop for the free extremities of plates 27—all in all, producing a compact, firm and closely fitting breech.

As illustrated in the drawings, the main rod 11, leg 12, and handles 16—17 may be conveniently and economically manufactured from sections of ordinary pipe joined together by suitable couplings.

In use, when it is desired to remove snow, for example, handle bars 16 and 17 of the shovel, as depicted in Fig. 1, are grasped by the hands, as the operator stands in an upright position to the rear and slightly to the left of bar 16. Supported by wheels 15, the shovel is steered towards the snow, and scoop 22 forced therein until the desired load has been obtained. The carriage is then, with a minimum of effort, rocked rearwardly with the wheels acting as fulcrum until the scoop occupies a substantially horizontal position. Next, the carriage is wheeled to a dumping destination; handle 17 is turned towards the left thereby, through chain 19 and link connections 35, latch 34 is withdrawn from the hook-like ends of slots 28, thus permitting the scoop 22, of its own weight, to swing downwardly on its hinged joint—comprised by eye 26, bifurcations 31, and pintle 32—and deposit the snow. After the scoop has been dumped plates 27 are automatically snapped in place by dragging the scoop a few inches—the weight of the carriage constraining the outer end of the scoop upwardly until slots 28 re-engage latch 34.

The entire snow removal operation is devoid of over-exertion and backstraining to the user of the portable shovel, and moreover, the job of cleaning is considerably expedited. Further, the shovel, being for the major part set-up from conventional pipe-lengths and couplings, and any standard type of scoop, can be manufactured and sold at a cost sufficiently low to place it within reach of all.

I have described the adoption of my invention specifically in connection with the removal of snow simply by way of exemplification. It is manifest, however, that in principle the invention is equally well designed to handle other materials, as dirt, soil, coal, etc.

I claim:

1. A portable shovel, comprising a tubular boom, running gear disposed approximately midway thereof, a pair of handle bars carried by the inner extremity of the boom, one of said bars being rotatable, a scoop hinged at the outer terminal of the boom, a latch controlling the hinge, and a flexible connection trained through the boom and cooperative with the rotatable bar to release the latch and dump the scoop.

2. A portable shovel involving a boom, running gear therefor, a scoop, a bar fixed to the scoop, a pair of plates on opposite sides of the bar, the plates having slots at their outer terminals, a yieldable latch arranged transversely of the outer extremity of the boom and engageable in said slots, a hinged joint between the distal end of the boom and said bar, a handle at the inner extremity of the boom, and a connection between the handle and the latch, said handle being manipulated to release the latch from the slots.

ARTHUR J. McLOUGHLIN.

REFERENCES CITED

The following references are of record in the file of this patent:

UNITED STATES PATENTS

| Number | Name | Date |
|---|---|---|
| 32,194 | Kirby | Apr. 30, 1861 |
| 378,571 | Brainard | Feb. 28, 1888 |
| 887,874 | Toy | May 19, 1908 |
| 909,521 | Bearinger | Jan. 12, 1909 |